Oct. 14, 1969   D. T. N. WILLIAMSON ET AL   3,472,103
TURNING APPARATUS

Filed Nov. 22, 1966   2 Sheets-Sheet 1

United States Patent Office 3,472,103
Patented Oct. 14, 1969

3,472,103
TURNING APPARATUS
David Theodore Nelson Williamson, London, England, and Charles Henri Kahn and Leon Fayolle, Paris, France, assignors to Molins Machine Company Limited, Deptford, London, England, a corporation of Great Britain
Filed Nov. 22, 1966, Ser. No. 596,323
Claims priority, application Great Britain, Nov. 23, 1965, 49,811/65
Int. Cl. B23b *3/00;* B26d *1/00;* B23p *15/28*
U.S. Cl. 82—1                                         4 Claims

ABSTRACT OF THE DISCLOSURE

A lathe in which lateral vibration of the shank of the turning tool is avoided by arranging the tool shank substantially tangential to the workpiece. The cutting tip may be offset from the longitudinal axis of the tool, which is parallel to the tangent at the cutting point, the offset, the length of the tool, and the radial and tangential forces being related by a given formula, or the cutting tip may lie on the longitudinal axis of the tool which is coincident with the resultant of the radial and tangential forces.

---

This invention relates to apparatus for performing socalled turning operations, i.e. for removing material from a workpiece by rotating the workpiece while it is held against a relatively stationary cutting tool. The common form of apparatus is termed a lathe, and this name will be employed hereinafter, but it should be understood that the invention may be applied to any apparatus for turning as above defined even although the construction of the apparatus is such that it bears little or no resemblance to conventional lathes.

In turning as heretofore performed, the cutting tool is of relatively elongated form, comprising a rod or bar partly clamped in a tool-holder and partly projecting therefrom, the tip of the projecting portion being ground to a shape appropriate to the operation to be performed and the material of the workpiece from which material is to be removed. The tool is so positioned as to extend substantially normal to the surface of the workpiece at the point engaged by the tip of the tool, i.e. so that the tool may be said to extend radially relative to the axis of rotation of the workpiece.

In the conventional turning operation, set up as above described, difficulties are encountered which can be traced to transverse vibration of the cutting tool. As the purpose of a typical turning operation is to remove material from the surface of the workpiece until that surface has a cylindrical form of desired radius and having its axis coincidental with the rotational axis, it is an obvious requirement that the tool tip shall maintain a constant position relative to said rotational axis; this requirement is not satisfied if the tool vibrates laterally. Even more important in many instances is the fact that the best materials for cutting tool tips (e.g. ceramics or cermets) are easily broken by vibration and hence when such vibration arises the depth of cut possible is severely limited.

The forces acting on the tool during a conventional turning operation are two, namely a holding force acting substantially longitudinally of the tool (radially relative to the rotational axis of the workpiece) so as to hold the tool in such engagement with the workpiece as is necessary for the desired depth of cut, and a reaction force acting substantially transversely of the tool (tangentially relative to the surface of the workpiece), being the reaction to the cutting effort. The resultant of these two forces acts obliquely on the tool, and is the force serving to excite vibrations therein, and its direction is such that considerable undesired lateral vibration of the tool is produced.

It is an object of the present invention to provide an improved turning apparatus in which the incidence of undesired tool vibration is minimized.

According to the invention we provide a turning apparatus comprising a rotatable work-holder and a toolholder arranged to hold a cutting tool relatively stationary but permitting adjustment of the position of said tool relative to the rotational axis of said work-holder, in which the relative positions of said tool-holder and workholder are such that during a turning operation the holding and reaction forces acting on said tool from the workpiece produce a resultant force so directed that tool vibration excited thereby is predominantly longitudinal vibration.

The tool and tool-holder may take various forms but at present we prefer to employ an elongated tool held in a tool-holder so arranged that the longitudinal axis of the tool extends substantially parallel to a tangent to the surface of the workpiece being turned through the point of contact between the tool and the workpiece; the tool may have a "tip" (e.g. a piece of tungsten carbide or like material) embedded in its side. With such a tool, correct spacing of the tip from its longitudinal axis for any particular ratio between the holding and reaction forces ensures that no bending of the tool is provoked and therefore that no transverse vibration is induced.

In an alternative preferred form, the cutting tip is sited on the longitudinal axis of the tool, and the tool is so mounted that its axis coincides with the line of action of the resultant of the holding and reaction forces.

In order that the invention may be well understood, a preferred arrangement of apparatus in according with the invention will now be described, referring to the accompanying diagrammatic drawings in which:

FIGURES 1 and 2 are similar to FIGURES 1 and 2 of U.S. application Ser. No. 567,243.

Figure 1:
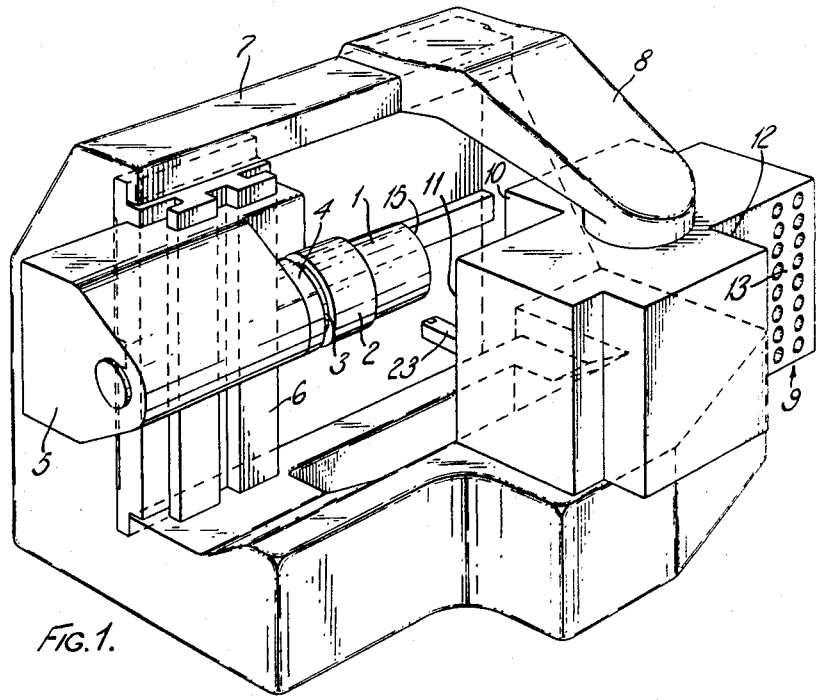
FIGURE 1 is a perspective view of a lathe embodying the present invention.
Figure 2:
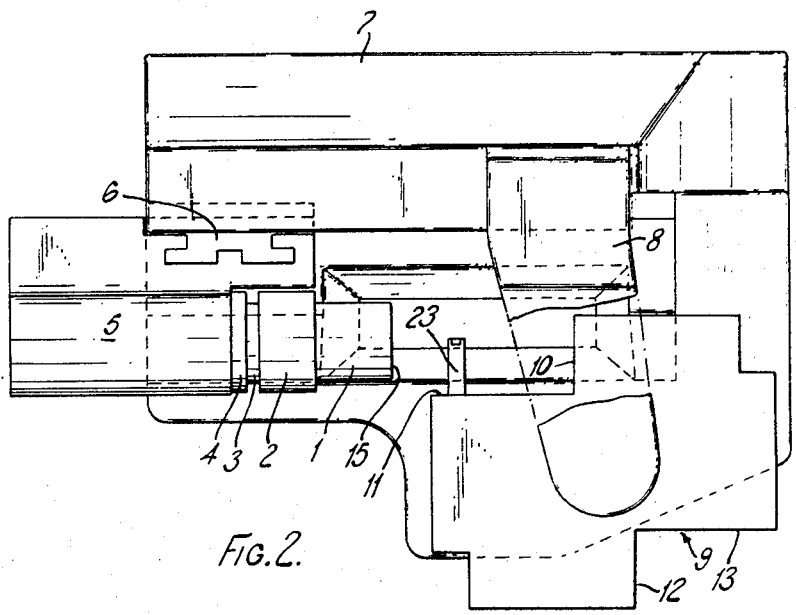
FIGURE 2 is a plan view of the lathe of FIGURE 1.

In the machine shown in FIGURES 1 and 2, a workpiece 1 is held in a chuck 2 which is fixed to a spindle 3. The spindle 3 rotates within a quill 4 which is slidable in an axial direction i.e. along the lathe's X axis, within a headstock 5. The spindle 3 is driven by a hydraulic motor or other suitable means, while the axial movement of the quill 4 is effected by a hydraulic or electrically operated actuator. The hydraulic motor and actuator are both contained within the headstock 5 and thus cannot be seen in either FIGURE 1 or FIGURE 2. The actuator holds the quill 4 in any selected position relative to the headstock 5, and, therefore, at any desired position along the machine's X axis.

The X axis is defined as the axis of the lathe, i.e. along its bed. The Y axis then becomes a vertical axis perpendicular to the X axis while the Z axis is perpendicular to both X and Y axes and is in the direction of the tool feed in a conventional centre lathe.

The headstock 5 has a degree of freedom of movement in a vertical direction, being movable up and down a slide 6 on the frame 7 of the lathe. This movement can be achieved in any convenient way, i.e. by a hydraulic actuator or by a mechanical linkage such as a nut and leadscrews. Whatever method is used, the actuator is capable of holding the headstock 5 in any desired position along the lathe's Y axis (i.e. vertically).

An arm 8 of the frame 7 carries a vertical column, the top part only of which can be seen in FIGURE 1, about which is pivotable a tool store indicated generally by reference numeral 9. The tool store 9 consists of four separate magazines 10, 11, 12 and 13, arranged in pairs, 10 and 11 being one pair and 12 and 13 the other. Of each pair one magazine 11 and 13 contains cutting tools while the other 10 and 12 contains drills, boring tools, reamers, etc. i.e. those tools which, like drill 14, are used for metal removal from the end face 15 of the workpiece 1. The tool store 9 can be locked in two positions. One position is shown in FIGURES 1 and 2 in which the magazines 10 and 11 are directed towards the workpiece 1. The tool store 9 is rotated through 180° to the other position so that the other pair of magazines 12 and 13 are directed towards the workpiece.

The tools carried in the magazines 11 and 13 are adapted for cutting from underneath the workpiece so that during a turning operation the holding and reaction forces acting on the tool produce a resultant force so directed that tool vibration exerted thereby is predominantly longitudinal vibration. An elongated cutting tool 23 is employed and is arranged so that the longitudinal axis of the tool extends substantially parallel to a tangent to the surface of the workpiece being turned through the point of contact between the tool and the workpiece, a "tip" being embedded in the top of the tool. For the sake of clarity of illustration the tool 23 is shown out of contact with the workpiece 1. For cutting to commence, the workpiece 1 would be moved to the right along the X axis by axial movement of the quill 4, and the headstock 5 would be lowered by means of the slides 6 to bring the workpiece down on to the tool 23.

Variations are possible on the apparatus shown in FIGURES 1 and 2. For instance the quill 4 might not be slidable within the headstock 5. Movement along the X axis might equally be obtained by making the slide 6 itself slidable along the bed of the machine. The tools in the magazines 10, 11, 12 and 13 are retracted when not in use. Obviously, each tool must be sufficiently separated from its neighbours so that machining operations can be undertaken without interference. By providing retractable tools, the number of tools stored within each magazine can be greatly extended since with only one tool at a time extending to a cutting datum which is, of course, along the Z axis, interference cannot take place.

The arrangement of magazines in pairs is such that one pair may be serviced by replacing worn tools or tool tips, tool changing, etc. while the other pair is in the operative position in relation to the workpiece. Thus the magazines 10 and 11 can be in use while the magazines 12 and 13 are readily available for servicing.

Operation of the lathe is controlled from a console which is not shown but which conforms generally to that now universally known as numerical control. In this a command signal originating from a programmed input is issued to the actuators, to the tool store, to the spindle drive unit and to any other part of the mechanism formerly manually controlled. This signal is compared with a feed-back signal dependent on the actual performance of the actuator, unit, etc. commanded. Any difference between the two signals then forms the basis of the next command signal. Such is a well proved system and any adaptation of it using, for instance, potentiometers, synchros, diffraction gratings, etc. can be used in the control of this lathe.

Figure 3:
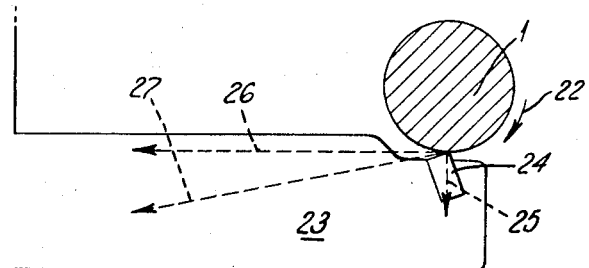
FIGURE 3 is a schematic view of a turning tool embodying the invention in operation.

In FIGURE 3 of the drawing, there is shown diagrammatically the workpiece 1 which during turning is rotated as indicated by the arrow 22, and the tool 23 which comprises a body or shank and a cutting tip 24 (e.g. of tungsten carbide) which is held in engagement with the workpiece 1. As the workpiece rotates material is cut from it in normal manner.

It will be observed that the shank 23 of the tool is so disposed as to extend substantially parallel to a tangent to the surface of the work at the point of contact with the tool tip 24. Arrow 25 represents the force acting on the tool by way of reaction from the tool being held against the work (radial force) and arrow 26 represents the reaction from the actual cutting (tangential force).

The resultant force acting on the tool will be directed as indicated by arrow 27, the exact direction depending of course upon the relative magnitudes of the two component forces. In general, however, the direction of the said resultant force lies closer to the longitudinal axis of the tool than transversely of the tool (as the tangential force is most commonly about five times the radial force), so that vibrations of the tool excited by said resultant force are principally longitudinal, and in view of the elongated form of the tool, will be of smaller amplitude than if the exciting force were more transversely directed, as is the case when the tool extends radially of the work as in a convention lathe.

It can be shown mathematically that an optimum position for the cutting point or edge of the tool can be calculated for given circumstances, at which position the transverse vibration theoretically should be zero and in practice will at least be minimized.

The basis of the calculation is to find an equation from which can be obtained the deflection of any given point on the neutral axis—i.e., the longitudinal axis—of the tool in response to given cutting forces.

The symbols employed are:

$M$ = bending moment (at the chosen point)
$E$ = Young's modulus for the material of the tool
$I$ = moment of inertia
$l$ = free length of the tool (measured from the level of the cutting tip)
$x$ and $y$ = coordinates of a chosen point A, the $x$ axis being the longitudinal axis of the tool
$R$ = radial reaction force on tool
$T$ = tangential reaction force on tool.

Figure 4:
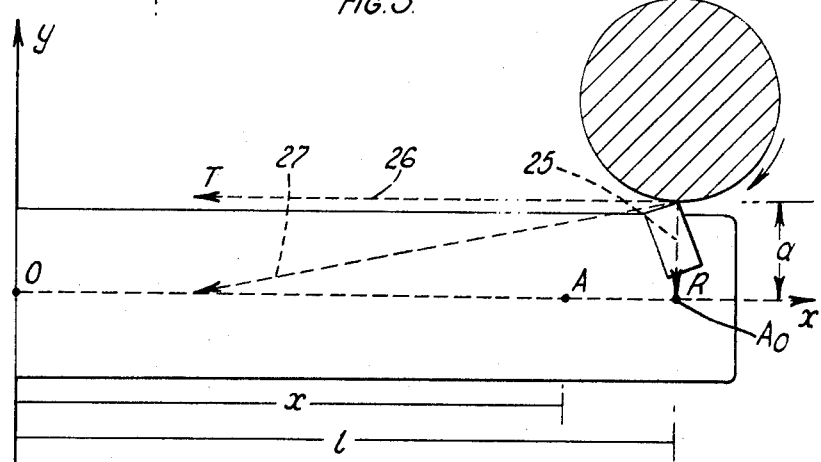
FIGURE 4 is a diagram of the tool of FIGURE 3, on a larger scale, illustrating the calculation of dimensions.

It will readily be seen from inspection of FIGURE 4 (where the above symbols are shown as far as possible) that the radial and tangential forces acting on the tool tend to bend it in opposite senses. Accordingly, if these effects can be made equal they will cancel one another; in this condition, there is minimum (theoretically zero) lateral vibration of the tool.

To calculate this optimum condition we assume therefore that there is no deflection of the free end of the tool due to the cutting forces. At any chosen point A on the longitudinal axis the bending moment equals the algebraic sum of the moments due the radial and tangential forces, i.e.

$$M = R(l-x) - Ta \qquad (I)$$

It is however known that, when bending a beam of uniform cross-section:

$$M = EI \frac{d^2y}{dx^2} \qquad (II)$$

and hence $$EI \frac{d^2y}{dx^2} = R(l-x) - Ta = Rl - Ta - Rx \qquad (III)$$

Integrating twice we derive $$EIy = \frac{Rlx^2}{2} - \frac{Tax^2}{2} - \frac{Rx^3}{6}$$

or $$\frac{2EIy}{x^2} = Rl - Ta - \frac{Rx}{3} \qquad (IV)$$

Considering the point $A_0$ (where a normal from the cutting tip intersects the longitudinal axis) with no deflection of this point we have coordinates $x=l$, $y=0$ (the origin being at point O, i.e. the intersection of the longitudinal axis of the tool with the surface of a tool holder in which the tool is gripped).

Substituting these coordinates in Equation IV we get $$0 = Rl - Ta - \frac{Rl}{3}$$

$$= \frac{2Rl}{3} - Ta$$

hence $$a = \frac{2}{3} \cdot \frac{R}{T} \cdot l \quad \text{(V)}$$

In Equation V, therefore, we have the means of calculating the optimum distance of the cutting tip from the tool axis; it is necessary to know the ratio between the radial and tangential forces for the particular turning operation to be performed.

It will be appreciated also from FIGURE 4 that $R/T = \tan \theta$, where $\theta$ is the angle between the tangent and the line of action of the resultant force 27 at the cutting tip. Hence $$a = \frac{2}{3} l \tan \theta \quad \text{(Va)}$$

From Equation Va, it is apparent that the resultant force 27 always, in the optimum condition, acts through a point on the neutral axis having coordinates $y = 0$, $$x = \frac{1}{3} \cdot l$$

Hence the optimum position of the cutting tip can be found geometrically by drawing a line through said point, at angle $\theta$ to the axis, to intersect a normal from the axis through point $A_0$.

Figure 5:
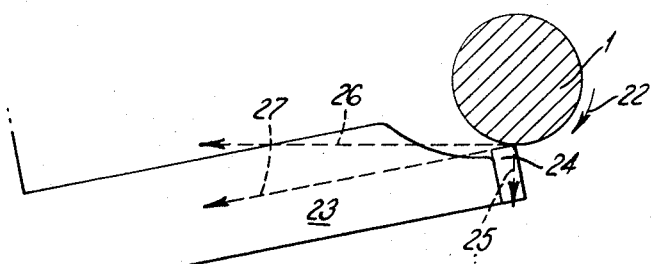
FIGURE 5 is a view, similar to FIGURE 3, of another form of turning tool embodying the invention.

FIGURE 5 illustrates a simpler form of apparatus. The parts are given the same references as before, but here it will be seen that the tool tip 24 lies on the longitudinal axis of the tool, and the tool is so mounted that its axis coincides with the line of action of resultant force 27; the vibrations excited therefore can only be longitudinal vibrations.

In the above calculations two assumptions have been made, (1) that shear forces and shear deflections may be neglected and (2) that the feed force i.e. the force which arises due to the traverse of the tool relative to the workpiece, and which is mutually perpendicular to the radial and tangential forces considered, is also negligible. In any particular case in which these two factors are not negligible then, clearly, they should be brought into the calculations and would modify the results somewhat. The feed force acts at the cutting point and is directed upwards perpendicular to the plane of FIGURES 3, 4 and 5. Thus, this feed force, if it is of a magnitude which cannot be neglected, will also tend to excite lateral vibration of the tool 23. The effect of this feed force is to modify the resultant force 27 so that its direction is inclined upwards somewhat relative to the planes of FIGURES 3, 4 and 5. Thus, to resist the effect of this third force the optimum position of the tool would be with it inclined to the plane of FIGURES 3, 4 and 5 at substantially the same angle to this plane as is made by the resultant force i.e. so that the resultant force passes through the longitudinal axis of the tool.

The reduction of vibration results in less disturbance of the position of the tool relative to the work, and hence to improved quality of machining; even more important, the depth of cut may be substantial without danger of breaking the tool tip, even if the latter is of a material such as cermet.

It will be understood that the arrangements shown are not the only possible arrangements, and that for example various other forms of tool may be employed within the scope of the invention.

What we claim as our invention and desire to secure by Letters Patent is:

1. A turning apparatus comprising a rotatable workholder for holding a workpiece and a tool-holder arranged to hold a longitudinally extending cutting tool having a cutting point thereon relatively stationary but permitting adjustment of the position of said tool relative to the rotational axis of said workpiece, the relative positions of said tool-holder and work-holder being such that the longitudinal axis of the tool extends substantially parallel to a tangent to the center of the workpiece through the point of contact between the tool and the workpiece, during a turning operation the forces exerted by said workpiece on said tool in a radial direction with respect to the rotational axis of said workpiece and in a tangential direction with respect to the surface of said workpiece produce a resultant force in a direction closer to the longitudinal than transverse axis of the tool, and the cutting point of the tool is offset radially of the workpiece a distance $a$ from the longitudinal axis of the tool according to the formula $$a = \frac{2Rl}{3T}$$

wherein l is the length of the tool from the tool holder to the cutting point, R is the radial force on the tool from the workpiece and T is the tangential force on the tool from the workpiece, such that the tool vibration excited thereby is predominantly longitudinal vibration.

2. A turning apparatus comprising a rotatable workholder for holding a workpiece and a tool-holder arranged to hold relatively stationary a longitudinally extending cutting tool having a cutting point lying on the longitudinal axis of the tool but permitting adjustment of the position of said tool relative to the rotational axis of said workpiece, the relative positions of said tool-holder and work-holder being such that during a turning operation the forces exerted by said workpiece on said tool in a radial direction with respect to the rotational axis of said workpiece and in a tangential direction with respect to the surface of said workpiece produce a resultant force which coincides with the longitudinal axis of the tool such that tool vibration excited thereby is predominately longitudinal vibration.

3. A turning apparatus as claimed in claim 2 wherein the tool is so mounted that its longitudinal axis coincides with the line of action of the resultant force produced by said radial and tangential forces on the tool from the workpiece and feed forces produced by the traverse of the tool relative to the workpiece which force is mutually perpendicular to said radial and tangential forces.

4. A turning apparatus as claimed in claim 1 wherein the tool is arranged so that a resultant force produced by said radial and tangential forces on the tool and the feed forces produced by the traverse of the tool relative to the workpiece which force is mutually perpendicular to said radial and tangential forces passes through the longitudinal axis of the tool.

References Cited

UNITED STATES PATENTS 1,154,804   9/1915   Radford _____ 29—96 XR

FOREIGN PATENTS 834,932   3/1952   Germany.
548,299   9/1956   Italy.

LEONIDAS VLACHOS, Primary Examiner

U.S. Cl. X.R.

29—95